US006632786B1

United States Patent
Wyatt

(10) Patent No.: US 6,632,786 B1
(45) Date of Patent: Oct. 14, 2003

(54) ATTRACTANT SCENT AND SOLID DELIVERY VEHICLE AND METHOD OF MANUFACTURE

(76) Inventor: Donald M Wyatt, 28300 Snickers La., Spirit Lake, ID (US) 83869

(*) Notice: Subject to any disclaimer, the term of this patent is extended or adjusted under 35 U.S.C. 154(b) by 174 days.

(21) Appl. No.: 09/628,115

(22) Filed: Jul. 28, 2000

Related U.S. Application Data

(60) Provisional application No. 60/146,282, filed on Jul. 29, 1999.

(51) Int. Cl.7 .......................... A61K 7/46; A01M 31/00
(52) U.S. Cl. .............................. 512/1; 512/4; 424/76.4; 424/84; 119/711; 43/1; 264/349
(58) Field of Search ..................... 512/1, 4; 424/76.4, 424/84; 119/711; 43/1; 264/349

(56) References Cited

U.S. PATENT DOCUMENTS

| 4,263,873 | A | | 4/1981 | Christianson |
| 4,472,377 | A | | 9/1984 | Teranishi et al. |
| 4,624,810 | A | * | 11/1986 | Sisbarro ................. 264/234 |
| 5,635,164 | A | * | 6/1997 | Moghe et al. ............. 424/65 |
| 5,672,342 | A | | 9/1997 | Bell |
| 5,916,352 | A | | 6/1999 | Perry |

* cited by examiner

Primary Examiner—Jill Warden
Assistant Examiner—Monique T. Cole
(74) Attorney, Agent, or Firm—David S. Thompson

(57) ABSTRACT

An attractant scent and solid delivery vehicle allows the application of attractant scent or other types of scent using a solid delivery vehicle, from a convenient container similar to that used for underarm deodorant. The attractant scent is typically animal urine, but other attractant scents or other types of scents, could be substituted. Approximately 40 parts water, 30 parts urine or other attractant, and 30 parts propylene glycol are mixed in a double-jacketed container. The mixture is heated to 160 degrees. Approximately 15 parts amorphous fumed silica and 10 to 15 parts sodium sterate are then added, and the ingredients are mixed thoroughly. The mixture is then cooled to 125 degrees. The cooled mixture is then poured into containers. Preferred containers include those used for underarm deodorant. In use, the attractant scent and solid delivery vehicle may be advanced from the container and a portion of the solid applied to form a thin coating on any desired surface, such as the bottom of a boot.

10 Claims, 1 Drawing Sheet

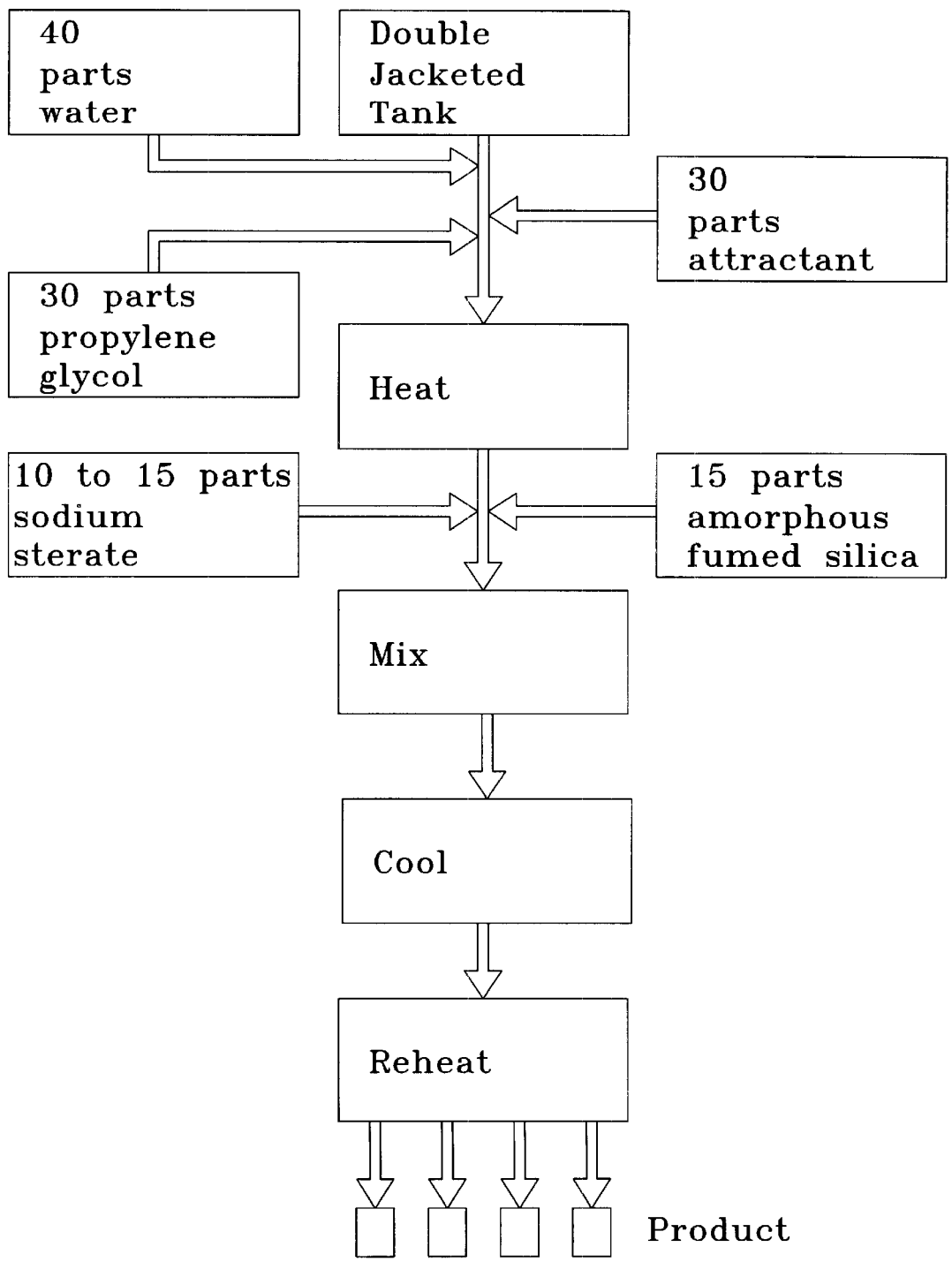

ATTRACTANT SCENT AND SOLID DELIVERY VEHICLE AND METHOD OF MANUFACTURE

CROSS-REFERENCES

This application claims the benefit of provisional application No. 60/146,282 filed Jul. 29, 1999.

There are no applications related to this application filed in this or an foreign country.

BACKGROUND

It is well known that attractant scent can be used both to attract game animals and to cover the scent of humans. The attractant used may be varied according to the needs of the hunter, but typically includes urine from a deer or other animal.

The known delivery vehicle used to transfer the scent is liquid; i.e. drops of liquid are sprinkled on the bottoms of boots or on other locations to which it is desired to transfer the scent.

Such a delivery vehicle has several flaws. First, the scent tends to be concentrated in small and specific locations where the drops were applied. It is generally difficult to spread the scent-producing chemicals in a wide but thin dispersion.

Second, efforts to wipe the liquid over greater areas, and to thereby reduce the concentration but extend the coverage area, generally tend to waste some of the liquid due to its tendency to adhere to the tool used to wipe the liquid. A related problem is that, where the liquid is wiped over a surface, the tool used to do the wiping must be cleaned.

For the foregoing reasons, there is a need for an attractant scent and solid delivery vehicle that allows the thin, uniform application of attractant scent to any surface. The solid delivery vehicle must not interfere with the smell of the attractant, must stay uniformly solid at a sufficiently large range of temperatures and must be compatible with a large number of commonly used attractants associated with hiking, hunting and fishing.

SUMMARY

The present invention is directed to an apparatus that satisfies the above needs. A novel attractant scent and solid delivery vehicle is disclosed that allows application of a thin, uniform coating of attractant scent to any surface. The attractant scent and solid delivery vehicle do not interfere with the smell of the attractant, stay uniformly solid at a wide range of temperatures, and are compatible with commonly used attractants associated with hiking, hunting and fishing.

A preferred version of the attractant scent and solid delivery vehicle of the present invention includes the following component ingredients, and is manufactured in the following manner.

(A) Assembling a preferred container for mixing, comprising a double-jacketed tank, which provides more uniform heating, and which tends to eliminate hot spots.

(B) Forming a mixture of water, propylene glycol and animal urine or other attractant or scent in the tank. The relative amounts of the ingredients are typically:
  (a) 40 parts water.
  (b) 30 parts propylene glycol.
  (c) 30 parts animal urine.

(C) Heating the mixture to approximately 160 degrees F.

(D) Adding between 10 to 15 parts sodium sterate to the mixture.

(E) Adding 15 parts of amorphous fumed silica to the mixture.

(F) Mixing the ingredients thoroughly.

(G) Cooling the mixture to 125 degrees F. over approximately 8 hours while in the double-jacketed tank.

(H) Reheating the mixture to 160 degrees F. with no lid on the double-jacketed tank. This allows the water content to evaporate, resulting in a more concentrated mixture.

(I) Assembling a number of containers for filling. Preferred containers include those used for underarm deodorant, including both the "push-up" style and the style that may be advanced or retracted by operation of a wheel.

(J) Pouring the mixture into the containers, where it is allowed to solidify, thereby forming the finished product.

It is therefore a primary advantage of the present invention to provide a novel attractant scent and solid delivery vehicle resulting from a method of manufacture that allows application of a thin, uniform coating of attractant to any surface.

Another advantage of the present invention is to provide a novel attractant scent and solid delivery vehicle resulting from a method of manufacture that does not interfere with the smell of the attractant, and which is compatible with a large number of attractants associated with the needs of hunters, fishermen and other outdoor activities.

A still further advantage of the present invention is to provide a novel attractant scent and solid delivery vehicle resulting from a method of manufacture that stays uniformly solid at a wide range of temperatures, including those encountered during both summer and winter activities.

These and other features, aspects, and advantages of the present invention will become better understood with reference to the following description.

BRIEF DESCRIPTION OF THE DRAWINGS

FIG. 1 is a schematic drawing showing an implementation of a method by which an attractant scent and solid delivery vehicle may be constructed.

DESCRIPTION

Referring to the below discussion, an attractant scent and solid delivery vehicle constructed in accordance with the principles of the invention is disclosed, and the method of manufacture of such an attractant scent and solid delivery vehicle can be understood. The attractant scent is typically animal urine, but other attractant scents or other types of scents, could be substituted. Approximately 40 parts water, 30 parts urine or other attractant, and 30 parts propylene glycol are mixed in a double-jacketed container. The mixture is heated to 160 degrees. Approximately 10 to 15 parts sodium sterate and 15 parts of amorphous fumed silica are then added, and the ingredients are mixed thoroughly. The mixture is then cooled to 125 degrees. The cooled mixture is then poured into containers. Preferred containers include those used for underarm deodorant. In use, the attractant scent and solid delivery vehicle may be advanced from the container and a portion of the solid applied to form a thin coating on any desired surface, such as the bottom of a boot.

The parts by which the various substances are measured may be any unit of volume, depending on the quantity of product that is desired. As a result, the number of parts of any particular substance expresses only the relative volume of that substance with respect to other substances, and there is no requirement that the total number of parts of all substances add to one hundred or any other value.

A preferred container for mixing is a double jacketed tank, which provides uniform heating, and which tends to eliminate hot spots. Such a double-jacketed tank provides water of other fluid in the area between the inner and outer tanks. The layer of water between the tanks prevents rapid heat transfer by conduction through the outer metallic jacket directly into the ingredients. As a result, the ingredients tend to heat at a more uniform rate, and scorching or burning of ingredients is eliminated.

A mixture of water, propylene glycol and animal urine or other attractant or scent is formed in the tank. In a preferred version of the invention, the relative amounts of the ingredients are typically:

(a) 40 parts water.

(b) 30 parts propylene glycol. The propylene glycol may be of an "industrial" grade, i.e. a grade that is not rated for application to human skin.

(c) 30 parts animal urine.

While the above relative amounts, expressed in terms of "parts," are preferred, some alteration of the amounts, both in relative and absolute terms, could be made. Throughout the entire disclosure, for example, while 30 parts of an ingredient may be preferred, a greater or lesser amount selected from the range 15 to 45 parts, might be substituted with acceptable results. Similarly, throughout the disclosure, where 40 parts is preferred, 20 to 60 parts might be substituted.

The mixture is then heated to approximately 160 degrees F. The exact rate of heating, and the exact temperature to which the mixture is heated is somewhat arbitrary, but effort should be made to adhere to the preferred method. The mixture should not be heated so rapidly as to create undue chemical changes. The rate at which the temperature is increased is partly dependent on the quality of the double-jacketed tank, which tends to protect the mixture from excessive heat application.

While the preferred temperature to which the mixture should be heated is 160 degrees F., some variation on this value may be made, while still achieving desirable results.

Approximately 15 parts amorphous fumed silica are then added to the mixture. Amorphous fumed silica is added to absorb excess water from the finished product.

Amorphous fumed silica is more properly known as synthetic amorphous silicon dioxide, crystalline free. The substance is more commonly known under trade names, such as CAB-O-SIL(R), made by the Cabot Corporation of Tuscola, Ill.

Approximately 10 to 15 parts sodium sterate are then added to the mixture. The sodium sterate may be of an "industrial" grade, which is not rated for human use.

The ingredients are mixed thoroughly. Mixing the ingredients tends to result in uniform heat distribution as well as homogeneous chemical blending.

The mixture is allowed to cool to 125 degrees F. over 8 hours. The cooling is facilitated by the double jacketed tank, which tends to slow the cooling rate. The exact rate of cooling, and the exact temperature to which the mixture is cooled is somewhat arbitrary, but effort should be made to adhere to the preferred method.

The mixture is then reheated to 160 degrees F. in the uncovered double-jacketed tank. During the reheating process, water that was originally added, as well as water that was part of the urine or other attractant, is evaporated away. Thus the reheating process results in a more concentrated mixture; i.e. a mixture with less water content.

A number of containers are assembled for filling. The preferred containers include those used for underarm deodorant, including both the "push-up" stle and the style that may be advanced or retracted by operation of a wheel.

The mixture is then poured into containers, where it is allowed to solidify, thereby forming the finished product.

The product is used by opening the container and advancing some of the solid material. The container is typically opened, in the manner of an underarm deodorant container, by removal of a screw-on or snap-on top. The material is advanced by using the push-up piston or by rotating wheel or other product advancing structure.

The solid may then be moved into contact with any surface on which it is desired to transfer a thin film of attractant. Due to the consistency of the solid, contact with a surface, such as the bottom of a boot, results in some of the solid being transferred to that surface.

The solid product may therefore be transferred to boots, clothing, rocks, trees cotton balls or any other surface. This may be done in hot summer weather or cold winter weather, since the attractant and delivery vehicle remains solid over a wide range of temperatures.

The previously described versions of the present invention have many advantages, including a primary advantage of providing a novel attractant scent and solid delivery vehicle resulting from a method of manufacture that allows application of a thin, uniform coating of attractant to any surface.

Another advantage of the present invention is to provide a novel attractant scent and solid delivery vehicle resulting from a method of manufacture that does not interfere with the smell of the attractant, and which is compatible with a large number of attractants associated with the needs of hunters, fishermen and other outdoor activities.

A still further advantage of the present invention is to provide a novel attractant scent and solid delivery vehicle resulting from a method of manufacture that stays uniformly solid at a wide range of temperatures, including those encountered during both summer and winter activities.

Although the present invention has been described in considerable detail and with reference to certain preferred versions, other versions are possible. For example, while preferred relative amounts of various ingredients have been disclosed, it is clear that some alteration of the relative quantities of the ingredients could be made. In general, while it is not preferred, up to 50% and greater alteration could be made. For example, where 40 parts of an ingredient are preferred, 20 to 60 parts might be used with varying degrees of success. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of manufacturing an attractant scent and solid delivery vehicle, comprising:

(A) assembling a container for mixing;

(B) forming a mixture of water, propylene glycol and animal urine attractant in the container;

(C) heating the mixture;

(D) adding sodium sterate to the mixture;

(E) adding amorphous fumed silica to the mixture;

(F) mixing the mixture thoroughly;

(G) cooling the mixture;

(H) reheating the mixture, whereby the water content is reduced by evaporation;

(I) assembling a product container; and (J) pouring the mixture into the product container and allowing the mixture to solidify, thereby forming a finished product.

2. The method of manufacturing an attractant scent and solid delivery vehicle of claim 1, wherein the attractant of part (B) is deer urine.

3. The method of manufacturing an attractant scent and solid delivery vehicle of claim 1, wherein mixture of part (B) comprises:

(a) 35 to 45 parts water;

(b) 25 to 35 parts propylene glycol; and (c) 25 to 35 parts attractant.

4. The method of manufacturing an attractant scent and solid delivery vehicle of claim 1, wherein the mixture in part (C) is heated to approximately 160 degrees F.

5. The method of manufacturing an attractant scent and solid delivery vehicle of claim 1, wherein in part (D) the quantity of sodium sterate added to the mixture is between 10 to 15 parts.

6. The method of manufacturing an attractant scent and solid delivery vehicle of claim 1, wherein in part (E) the quantity of amorphous fumed silica added to the mixture is between 10 to 20 parts.

7. The method of manufacturing an attractant scent and solid delivery vehicle of claim 1, wherein the mixture in part (G) is cooled to 125 degrees F. over approximately 8 hours in a double jacketed tank.

8. A method of manufacturing an attractant scent and solid delivery vehicle, comprising:

(A) assembling a container for mixing, comprising a double jacketed tank configured to provide more uniform heating and to eliminate hot spots;

(B) forming a mixture of water, propylene glycol and animal urine attractant in the tank, the mixture comprising:

(a) 35 to 45 parts water;

(b) 25 to 35 parts propylene glycol; and (c) 25 to 35 parts attractant;

(C) heating the mixture to 160 degrees F.;

(D) adding 10 to 15 parts sodium sterate to the mixture;

(E) adding 10 to 20 parts amorphous fumed silica to the mixture;

(F) mixing the mixture thoroughly;

(G) cooling the mixture to 125 degrees F. over approximately 8 hours while in the double jacketed tank;

(H) reheating the mixture, whereby the water content is reduced by evaporation, resulting in a more concentrated mixture;

(I) assembling a plurality of product containers; and (J) pouring the mixture into the product containers and allowing the mixture to solidify, thereby forming the finished product.

9. An animal attractant scent for use in a solid delivery vehicle, the animal attractant scent comprising a solidified mixture, wherein the solidified mixture comprises:

(A) water;

(B) propylene glycol;

(C) animal urine attractant;

(D) sodium sterate; and (E) fumed silica.

10. The animal attractant scent of claim 9, additionally comprising:

(a) wherein the water comprises 35 to 45 parts water;

(b) wherein the propylene glycol comprises 25 to 35 parts propylene glycol;

(c) wherein the animal urine attractant comprises 25 to 35 parts attractant;

(d) wherein the sodium sterate comprises 10 to 15 parts sodium sterate; and (e) wherein the fumed silica comprises 10 to 20 parts fumed silica.

\* \* \* \* \*